F. E. SCHARTOW.
SNAP HOOK.
APPLICATION FILED JAN. 4, 1909.
947,764.
Patented Jan. 25, 1910.
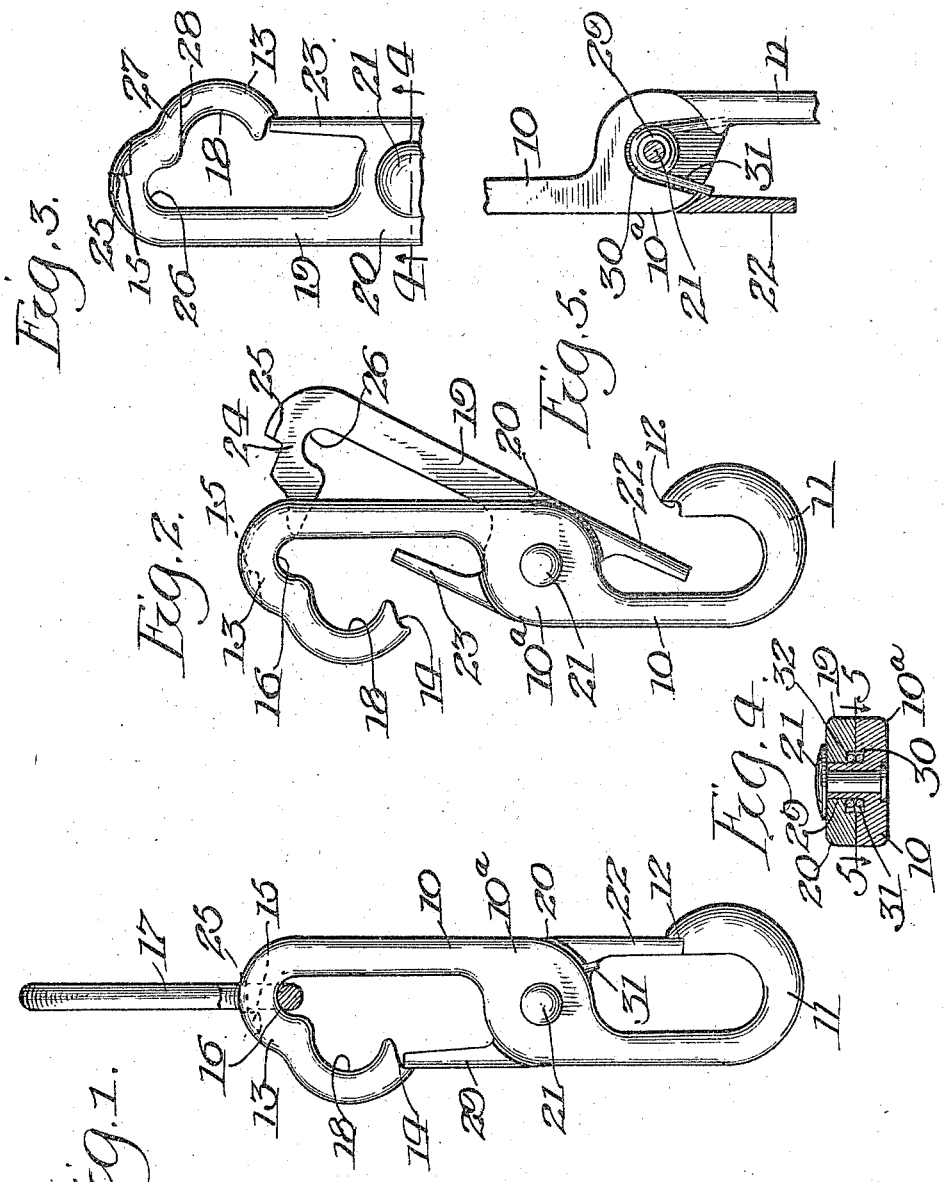
Witnesses:
Inventor
Frank E. Schartow,
by Chas. C. Tillman, Atty.

UNITED STATES PATENT OFFICE.

FRANK E. SCHARTOW, OF RACINE, WISCONSIN, ASSIGNOR TO BARTON MANUFACTURING COMPANY, OF RACINE, WISCONSIN, A CORPORATION OF WISCONSIN.

SNAP-HOOK.

947,764.  Specification of Letters Patent.  Patented Jan. 25, 1910.

Application filed January 4, 1909. Serial No. 470,691.

*To all whom it may concern:*

Be it known that I, FRANK E. SCHARTOW, a citizen of the United States, residing at Racine, in the county of Racine and State of Wisconsin, have invented certain new and useful Improvements in Snap-Hooks, of which the following is a specification.

This invention relates to certain new and useful improvements in snap-hooks of the type used in connection with harness for fastening two parts together, and more particularly for detachably connecting breast-chains to the hames or trace-chains to other parts; and it consists in certain peculiarities of the construction, novel arrangement, and operation of the various parts thereof, as will be hereinafter more fully set forth and specifically claimed.

The principal object of the invention is to provide a snap-hook of the above-named general character which shall be simple and inexpensive in construction, strong, durable and effective in operation, and so made that its members when engaging the links of chains, or other parts to be united, will be locked in their closed position, thus preventing accidental detachment or unfastening.

Another object of the invention is to provide a snap-hook of such construction that it may be easily and quickly attached to and readily removed from the chains or parts to be united thereby.

Other objects and advantages of the invention will be disclosed in the subjoined description and explanation.

In order to enable others skilled in the art to which my invention pertains, to make and use the same, I will now proceed to describe it, referring to the accompanying drawing, in which—

Figure 1 is a view in side elevation of a snap-hook embodying the invention, showing one end thereof in engagement with a link of a chain or ring and illustrating the parts in their normal position; Fig. 2 is a similar view showing the members of the hook in position to permit the hook to engage or receive at each of its ends a link or ring on the chains or parts to be united; Fig. 3 is a fragmental view in elevation of the reverse side of the hook from that shown in Figs. 1 and 2, illustrating the parts in their normal positions; Fig. 4 is a cross-sectional view taken on line 4—4 of Fig. 3 looking in the direction indicated by the arrows, showing the manner of pivotally connecting the members of the hook as well as the way of nesting the spring which actuates one of said members; and Fig. 5 is a view partly in section and partly in elevation taken on line 5—5 of Fig. 4 looking in the direction indicated by the arrows.

Like numerals of reference, refer to corresponding parts throughout the different views of the drawing.

The reference numeral 10 designates the body or main member of the hook which is provided at one of its ends with a hook 11 preferably having at its free end a recess 12 to receive one of the arms of the other member, as will be presently explained. The body or main member 10 has at its end opposite that on which the hook 11 is formed an oppositely disposed hook 13 which is also preferably provided in its free end with a recess 14 to receive the other arm on the other member.

As is clearly shown in Figs. 1, 2 and 3 of the drawing the outer extremity of the hooked portion 13 is provided with a lug 15 while the inner extremity of said portion is formed with a recess 16 to receive a link or ring 17 of a chain or other part. Between the recess 16 and the free end of the hooked part 13 is provided another recess 18 which is preferably produced by forming the hooked portion 13 with an outward bend as is clearly shown, and said last-named recess is for the purpose of receiving the link or ring 17 when it is desired to separate the members of the hook as shown in Fig. 2 of the drawing. The main member or body 10 is enlarged as at 10ª at about its middle, and said enlarged portion as well as the major part of the hooked portion 13 of said member is flattened on its surface adjacent to the other or locking member 19 of the hook which latter member is provided with an apertured enlarged portion 20 pivotally connected by means of a rivet 21 to the enlarged portion 10ª of the body or main member. Extended in opposite directions and from opposite edges or sides of the enlarged portion 20 of the member 19 are arms 22 and 23 which, when in their normal positions, will engage or approach the free ends or recessed portions 12 and 14 of the hooked portions 11 and 13, respectively, of the main member.

As is clearly shown in Figs. 2 and 4 of the drawing the enlarged portion 20 of the member 19, as well as the major part of said member, is flattened on its surface adjacent to the main member so that when the parts are closed as shown in Figs. 1 and 3 they will lie closely together. The member 19 is provided at its free end with a hooked portion 24 which has on its outer portion a recess 25 to engage the lug 15 in the outer extremity of the hooked portion 13 of the main member. The hooked portion 24 is provided on its inner surface with a recess 26 to register with the recess 16 of the hooked portion 13 when the members are in their normal positions. The free end of the hooked portion 24 of the member 19 is provided with a laterally extended foot 27 to rest against an enlargement 28 on the hooked portion 13 of the main member, as is clearly shown in Fig. 3 of the drawing.

By reference to Figs. 4 and 5 it will be seen that the enlarged portion 10$^a$ of the main member 10 is provided on its surface adjacent to the member 19 with a hollow sleeve 29 to receive the pivot-pin or rivet 21, one end of which is preferably countersunk in the outer surface of the main member. The enlarged portion 10$^a$ of the main member 10 is provided on its inner surface around the sleeve 29 with a depression 30 to receive a portion of a spring 31 which is coiled around said sleeve and engages with one of its ends the member 10 and with its other end the arm 22 on the other member 19 of the hook, which latter member is also provided on its inner surface with a recess 32 to receive a portion of the spring 31, as is clearly shown in Fig. 4 of the drawing.

From the foregoing and by reference to the drawing it will be readily understood and clearly seen that the spring 31 acting on the members 10 and 19 will normally hold the arms 22 and 23 of the latter member in engagement with or close to the free ends of the hooked portions 11 and 13, respectively, of the first-named member, when by pressing on the arm 22 the member 19 will be caused to assume about the position shown in Fig. 2 of the drawing, thus permitting rings or links to be passed between the arms 22 and 23 and the free ends of the hooked portions 11 and 13, when by releasing the pressure on the arm 22 it is evident that the member 19 will assume its normal position as shown in Figs. 1 and 3, and as long as the link 17 is held in the recess 16 of the hooked portion 13 the members will be securely locked together, but if it is desired to remove the links or rings from the hooked portions 11 and 13 this may be easily accomplished by moving the link from the recess 16 into the link 18, when it is apparent that the member 19 may be again turned to the position shown in Fig. 2 of the drawing, thus opening the hooked portions of the device.

It is manifest that by providing the hooked portion 24 of the member 19 with the recess 25 to receive the lug 15 of the hooked portion 13 the strain on the pivot of the members will be lessened or removed.

Having thus fully described my invention, what I claim as new, and desire to secure by Letters-Patent, is—

A snap-hook consisting of a main member having an oppositely disposed hooked portion at each of its ends to engage links or rings of parts to be secured together by the hook, one of said hooked portions having a lug on its outer end and a recess on its inner surface, the latter to receive one of said links or rings, and a spring-actuated locking-member pivotally secured to the main member between the ends thereof and having an oppositely disposed arm on each side of its pivot to approach or engage the free ends of said hooked portions and also provided with a hooked portion at one of its ends to register with one of the hooked portions on the main member, said hooked portion of the locking-member having a recess in the outer portion of its extremity to receive the aforesaid lug and a recess on the inner portion thereof to register with the recess on the inner surface of one of the hooked portions on the main member.

FRANK E. SCHARTOW.

Witnesses:
 Jno. W. Knight,
 A. L. Anderson.